(12) United States Patent
Brandon et al.

(10) Patent No.: US 10,503,816 B2
(45) Date of Patent: Dec. 10, 2019

(54) REAL-TIME VIEW-BASED REPORTING METADATA

(71) Applicant: SAP SE, Walldorf (DE)

(72) Inventors: Janel Lynn Brandon, Brisbane (AU); Willy Tjandra, Brisbane (AU); Raghavendra Konduru, Brisbane (AU); Alvin Sheng Jye Lim, Brisbane (AU)

(73) Assignee: SAP SE, Walldorf (DE)

( * ) Notice: Subject to any disclaimer, the term of this patent is extended or adjusted under 35 U.S.C. 154(b) by 280 days.

(21) Appl. No.: 15/606,476

(22) Filed: May 26, 2017

(65) Prior Publication Data

US 2018/0341629 A1    Nov. 29, 2018

(51) Int. Cl.
*G06F 17/22* (2006.01)
*G06F 16/951* (2019.01)
*G06F 16/9038* (2019.01)

(52) U.S. Cl.
CPC ...... *G06F 17/2247* (2013.01); *G06F 16/9038* (2019.01); *G06F 16/951* (2019.01)

(58) Field of Classification Search
CPC .................................................. G06F 17/2247
USPC .......................................................... 715/234
See application file for complete search history.

(56) References Cited

PUBLICATIONS

MySQL, "8.1. SQL Query Tab" (Year: 2015).*

* cited by examiner

*Primary Examiner* — Shawn S Joseph
(74) *Attorney, Agent, or Firm* — Schwegman Lundberg & Woessner, P.A.

(57) ABSTRACT

In an example, a database is accessed to obtain a first metadata type, the database further including a second metadata type and a third metadata type, the third metadata type including instance-specific reporting metadata. The first metadata type is persisted in the memory, while the instance-specific reporting metadata is not persisted. In response to receiving a request from the graphical user interface to provide options for inclusion in a custom report template for the user, information from the first metadata type is sent to a graphical user interface, information regarding the instance-specific reporting metadata is generated by executing structured query language (SQL) queries stored in database views for the database.

20 Claims, 14 Drawing Sheets

HOME                                              ADMIN    RESOURCES

EMPLOYMENT

CUSTOM LOCATION (NAME)
CUSTOM LONG 9
CUSTOM PAYGROUP
CUSTOM PAYGROUP (LABEL)
CUSTOM PAYGROUP (LABEL)
CUSTOM PAYGROUP (PAY GROUP ID)
CUSTOM PAYGROUP (PAY GROUP ID)
CUSTOM STRING 15 DB
CUSTOM STRING 15 DB (EXTERNAL CODE)
CUSTOM STRING 15 DB (LABEL)
CUSTOM STRING 16 DB

> USER (BACKGROUND INFO)
> WORKFLOW
> EMPLOYMENT DETAILS
  BENEFITS END DATE
  CUSTOM DOUBLE 1
  CUSTOM LONG 1
  ELIGIBLE FOR SALARY CONTINUATION
  ELIGIBLE FOR STOCK
  EMPLOYMENT ID
  HIRE DATE
  INITIAL OPTION GRANT
  INITIAL STOCK GRANT

| RESULTS | OBJECTS | COLUMNS | | | | | |
|---|---|---|---|---|---|---|---|
| COMPANY (LABEL) | COMPANY | COST CENTER ACCOUNT (LABEL) | DEPARTMENT (LABEL) | DIVISION (LABEL) | JOB TITLE | | HIRE DATE |
| ACE USA | 1 | INDUSTRIES R&D | RESEARCH & DEVELOPMENT | | SENIOR SOFTWARE ENGINEER | | 1/1/2001 |
| ACE ITALY | 42 | SERVICES EMEA | CLIENT SERVICE | INDUSTRIES123 | ENGINEER | | 12/3/2008 |
| ACE USA | 1 | PATIENT CARE | CLINICAL | SVC11111111 | SENIOR CONSULTANT | | 7/29/2008 |
| ACE USA | 1 | TALENT1 | TALENT MANAGEMENT | INDUSTRIES123 | EMERGENCY MANAGEMENT COORDINATOR | | 1/1/2001 |
| | | | | INDUSTRIES123 | RECRUITER - BRANDS | | 1/1/2001 |
| | | | | | CLIENT | | |

```
CREATE VIEW "AL_QAMPEPSI_ROTS". "RPT_REALM" ("REALM_ID",
        "ORG_ID",
        "VERSION",
        "IS_HIDDEN",
        "MODULES_USED",
        "LOCALE_LABEL_XML" ) AS ( (SELECT
    T1.REALM_ID ,
    'AL_QAMPEPSI' AS ORG_ID ,
    T1.VERSION ,
    CASE WHEN T3.REALM_ID IS NULL
        THEN 1
        ELSE T1.IS_HIDDEN
        END AS IS_HIDDEN ,
    T1.MODULES_USED ,
        '<?XML VERSION="1.0" ENCODING="UTF-8"?><LABELS><LABEL LOCALE="DEFAULT"
        ><![CDATA[ ' || T2.DISPLAY_NAME ||']]></LABEL><LABELS>' AS LOCALE_LABEL_XML
        FROM WST_LOOKUP.RPT_REALM T1
        LEFT JOIN ( SELECT
    DISTINCT REALM_ID
            FROM RPT_OBJECT
            WHERE VERSION = '1505.1'
            AND OBJECT_TYPE = 1 ) T3 ON T1.REALM_ID = T3.REALM_ID
        LEFT JOIN WST_LOOKUP.RPT_DISPLAY_NAME T2 ON T1.VERSION = T2.VERSION
        AND T1.REALM_ID = T2.ID
        AND T2.OWNER_TYPE = 3
        WHERE T1.VERSION = '1505.1')
    UNION (SELECT
        T1.REALM_ID ,
        'AL_QAMPEPSI' AS ORG_ID ,
        T1.VERSION ,
        0 AS IS _HIDDEN ,
        'CUSTOM_MDF' AS MODULES_USED ,
        ( SELECT
            '<?XML VERSION="1.0" ENCODING= "UTF-8"?><LABELS>' || STRING_AGG('<LABEL
            LOCALE="' || LOCALE || '"><![CDATA[ ' || LABEL ||']]></LABEL>') || '</LABELS>'
                FROM "CONFIG_GENERIC_OBJECT_T_GOLOCALIZEDDATA" LOC
                WHERE LOC.INTERNAL_ID = T1.LABEL_ID
                AND LOC.PARENT_ROW_ID = T1.ROW_ID ) AS LOCALE_LABEL_XML
        FROM RPT_OBJECT_MDF_STD_CUSTOM T1
        LEFT JOIN WST_LOOKUP.RPT_REALM T2 ON T1.VERSION = T2.VERSION
        AND T1.REALM_ID = T2.REALM_ID
        WHERE T1.MDF_OBJECT_NAME LIKE 'CUST$_%' ESCAPE '$'
        AND T1.OBJECT_TYPE = 1
        AND T2.REALM ID IS NULL)) WITH READ ONLY
```

*FIG. 11*

REAL-TIME VIEW-BASED REPORTING METADATA

TECHNICAL FIELD

This document generally relates to systems and methods for reporting-based computer software. More specifically, this document relates to the real-time view-based reporting of metadata.

BACKGROUND

Large computer systems can gather and analyze data generated by a large number of different sources. Extremely large data sets may be analyzed computationally to reveal patterns, trends, and associations. Such large data sets are often referred to as "big data." Big data tools can analyze high-volume, high-velocity, and high-variety information assets far better than conventional tools and relational databases that struggle to capture, manage, and process big data within a tolerable elapsed time and at an acceptable total cost of ownership.

Oftentimes it is beneficial to generate reports to summarize relevant data from the database(s). These reports may be defined and then executed to fill the fields of the report with summaries of data. For example, a human resources (HR) director may create a report to see compensation, goals, performance, etc., of employees in an organization. The reports are created through the manipulation of reporting metadata, which represents categories and relationships that define the data and how the data can be structured in reports by the end user.

As the size of the underlying data increases, however, there are a number of technical challenges that are introduced in the manipulation and usage of reporting metadata. Reporting metadata is persisted in a database, which means that any time any parameters related to the reporting data are updated, the metadata has to be regenerated to reflect the changes. If reporting metadata are not persisted, the complexity of the relationships between the data cannot be reflected in the metadata when the data sets grow too large, limiting the solution's usefulness.

BRIEF DESCRIPTION OF DRAWINGS

The present disclosure is illustrated by way of example and not limitation in the figures of the accompanying drawings, in which like references indicate similar elements and in which:

FIG. 7 is a screen capture illustrating a fourth user interface screen of the reporting tool user interface in accordance with an example embodiment.

FIG. 11 is a diagram illustrating an example of a particular instance-specific view, in accordance with an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a hybrid persistence model is introduced that persists part of the metadata and configuration while not persisting other parts of the metadata. The selection of which metadata to persist is based on the underlying variable parameters related to the metadata and how often those variable parameters are updated.

Figure 1:
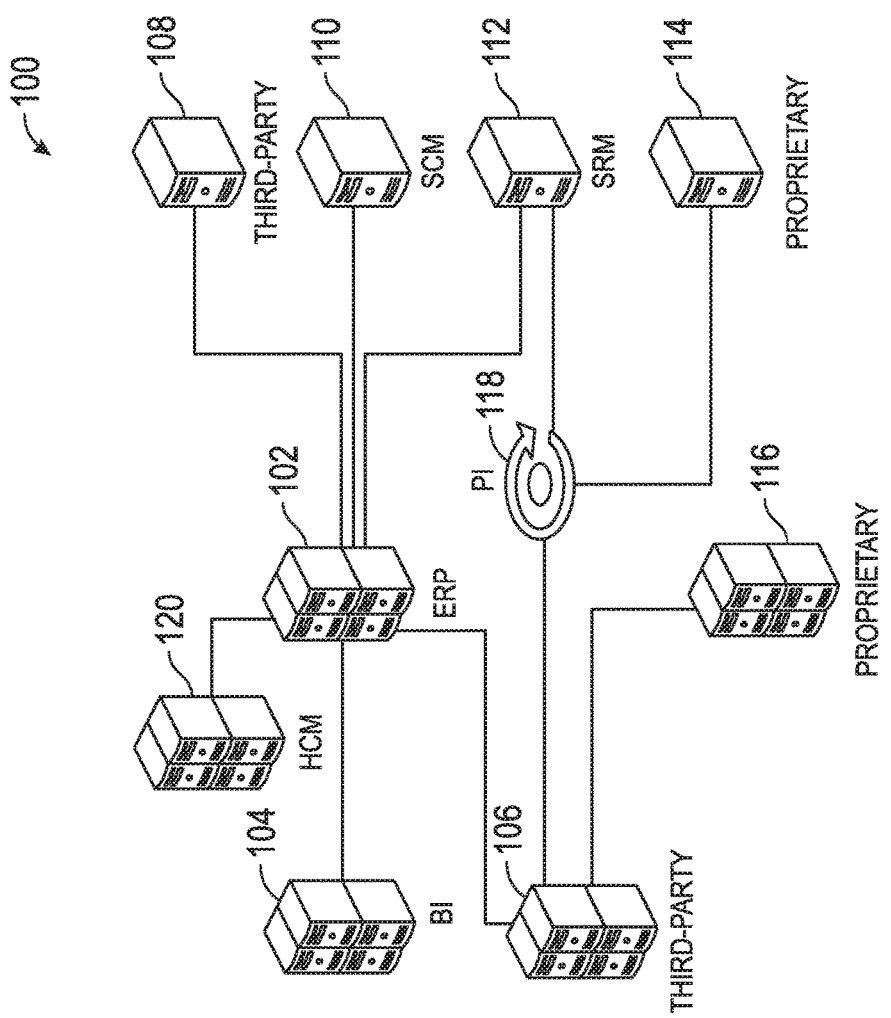
FIG. 1 is a block diagram of an application system, in accordance with an example embodiment.

FIG. 1 is a block diagram of an application system, in accordance with an example embodiment. The application system 100 comprises different heterogeneous software and/or hardware components 102 to 116, which are connected to each other as shown by the solid lines in FIG. 1, and which may operate together in the application system 100 to process, for example, a business scenario. The application system 100 may comprise an enterprise resource planning (ERP) system 102. The ERP system 102 may integrate internal and external management information across an entire organization, embracing different activities and/or services of an enterprise. The ERP system 102 automates the activities and/or services with an integrated computer-based application. The ERP system 102 can run on a variety of hardware and/or network configurations, typically employing a database to store its data. The ERP system 102 may be associated with (e.g., directly or indirectly connected to and/or in (networked) communication with) a business intelligence (BI) component 104, one or more third parties 106 and 108, a supply chain management (SCM) component 110, and/or a SRM component 112. The SRM component 112 and/or the SCM component 110 may further be associated with at least one proprietary service 114. Furthermore, at least one of the third parties 106 may also be associated with at least one proprietary service 116. The BI component 104 may provide historical, current, and predictive views of business processes and/or business scenarios, for example, performed on the ERP system 102. Common functionality of business intelligence technologies may comprise reporting, online analytical processing, analytics, data mining, business performance management, benchmarking, text mining, and/or predictive analytics. The functionality may be used to support better decision making in the ERP system 102. The SCM component 110 may manage a network of interconnected businesses involved in the provision of product and/or service packages called for by end consumers such as the ERP system 102. The SCM component 110 may span movement and storage of raw materials, work-in-process inventory, and finished goods from point of origin to point of consumption (also referred to as a supply chain). The SRM component 112 may specify collaborations with suppliers that are vital to the success of the ERP system 102 (e.g., to maximize the potential value of those relationships). All of these systems may be integrated via a PI component 118.

One additional system that may integrate with an ERP system 102 is a Human Capital Management (HCM) system 120, also sometimes referred to as an HCM suite. An HCM system 120 is integrated software for both employee records and talent management processes. The records component provides managers in an organization with the information they need to make decisions that are based on data. Talent management can include dedicated modules for recruitment, performance management, learning, and compensation management, and other applications related to attracting, developing, and retaining employees.

The HCM system 120 streamlines and automates many of the day-to-day record-keeping processes and provides a framework for Human Resources staff to manage benefits administration and payroll, map out succession planning and document such things as personnel actions and compliance with industry and/or government regulations.

Figure 2:
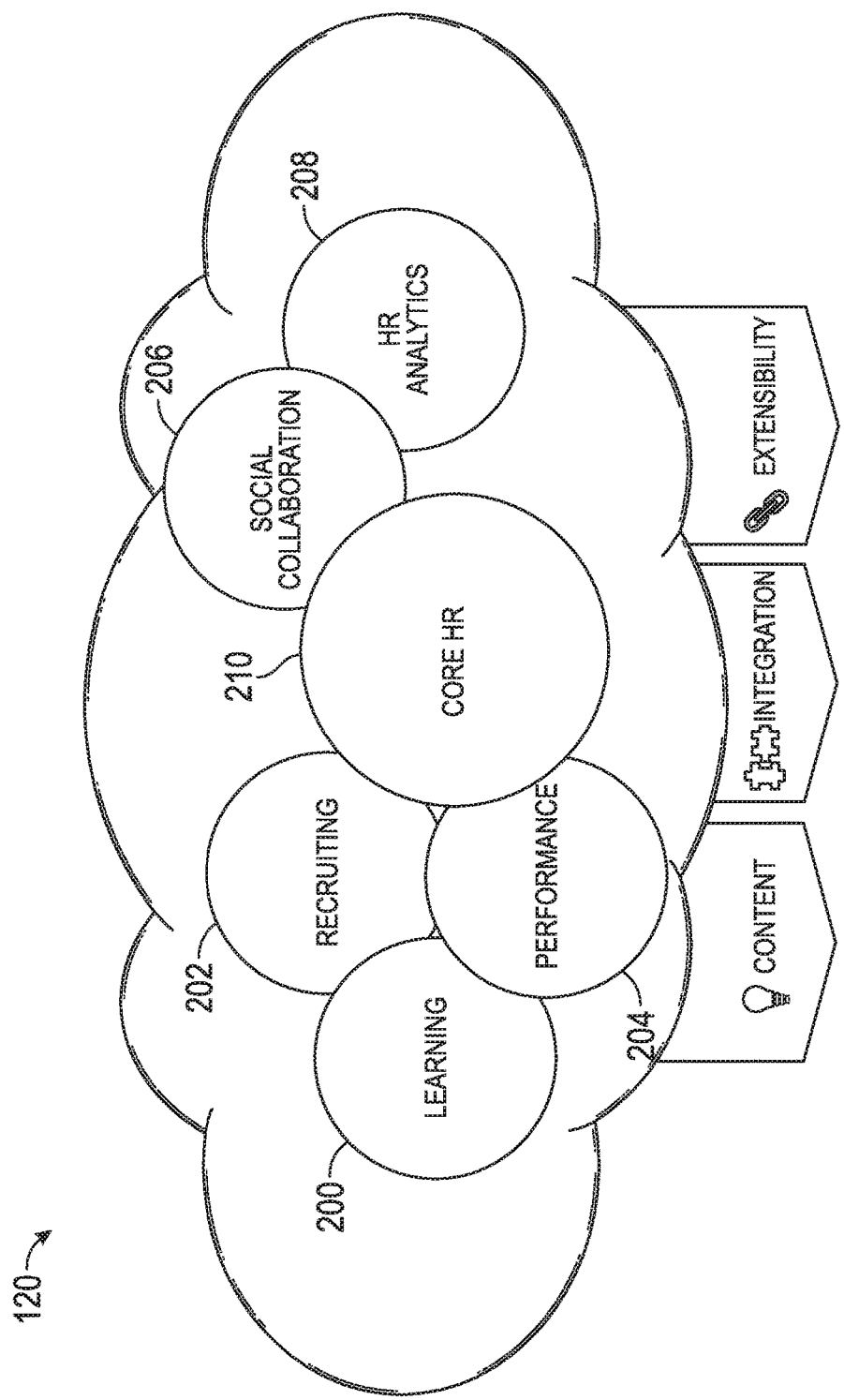
FIG. 2 is a block diagram illustrating a Human Capital Management (HCM) system in more detail, in accordance with an example embodiment.

FIG. 2 is a block diagram illustrating an HCM system 120 in more detail, in accordance with an example embodiment. Here, the HCM system 120 includes many application processes, including learning 200, which is a learning management system for training and learning activities, recruiting 202, which is a tool for recruiting management and marketing, performance 204, which is a tool for performance and goal management, social collaboration 206, which is tool for social networking and other forms of collaboration, HR analytics 208, which is a comprehensive analytics and reporting system, and core HR 210, which is a tool which integrates all the application processes.

Figure 3:
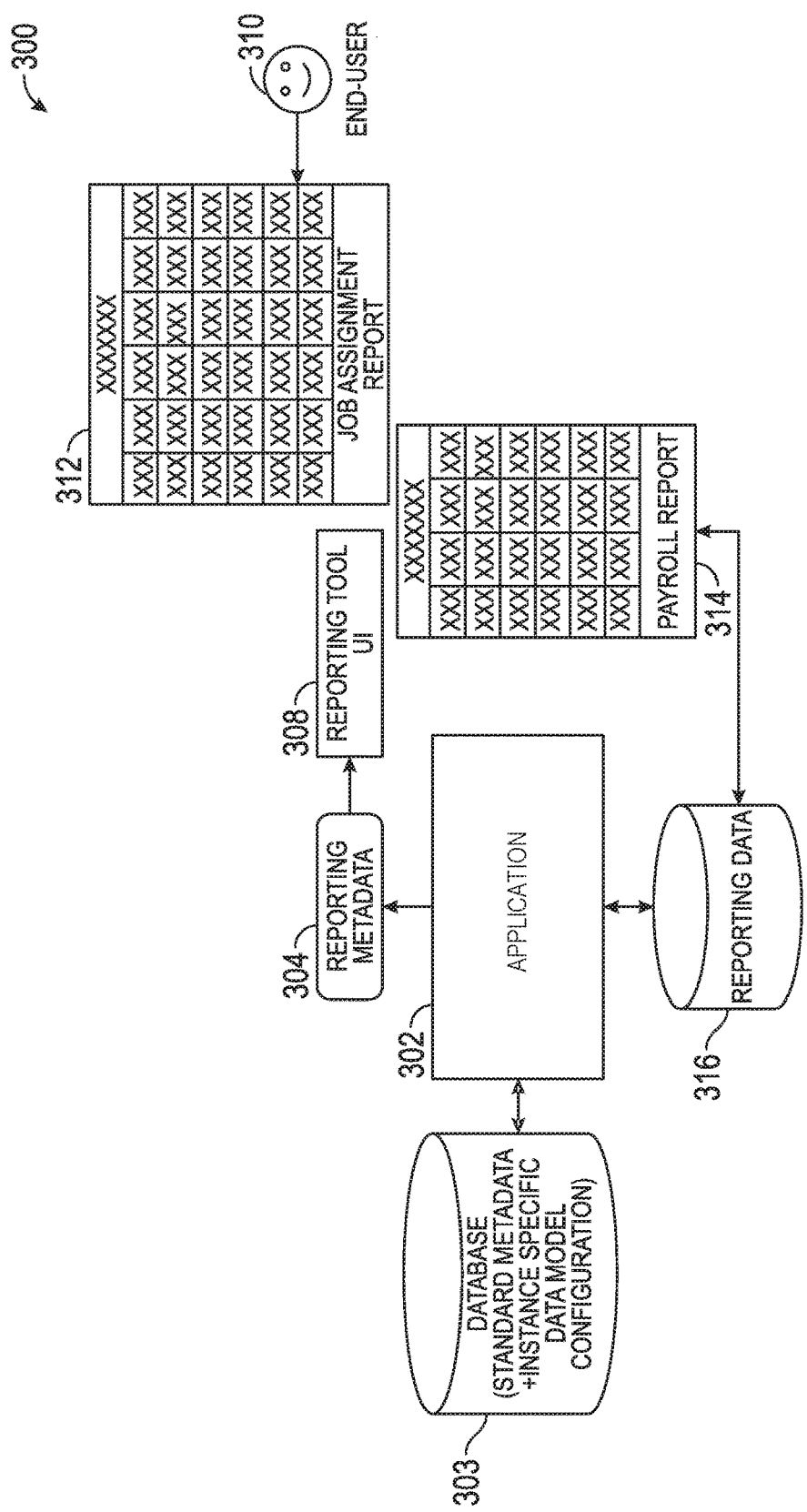
FIG. 3 is a block diagram illustrating a reporting solution application system in accordance with an example embodiment.

FIG. 3 is a block diagram illustrating a reporting solution application system 300 in accordance with an example embodiment. In some example embodiments portions of the reporting solution application system 300 may be, or may be included within, the HR analytics 208 application process of FIG. 2. An application 302 may access database 303 to obtain metadata and configuration data, such as schema information, for data structures containing information relevant to reporting. From this the application 302 may generate reporting metadata 304, which is then used in a reporting tool user interface 308 to present options to an end-user 310 to create and generate reports, such as a job assignment report 312 and payroll report 314, from reporting data 316. The options made available to the end-user 310 for inclusion in the reports 312, 314 include objects and fields from the database 303 and may be presented in a series of user interface screens in the reporting tool user interface 308. The reporting tool user interface 308 may be, for example, a client application operating on a client computer. Alternatively, the reporting tool user interface 308 may be embedded in a web page that is run by a web browser on a client computer. Alternatively, the reporting tool user interface 308 may be an application (or "app") operating on a mobile device. In various of these embodiments, input from the end-user 310 may be received via one or more computing peripherals, such as keyboards, mice, and the like, or via touchscreen interfaces through finger presses and gestures.

Figure 4:
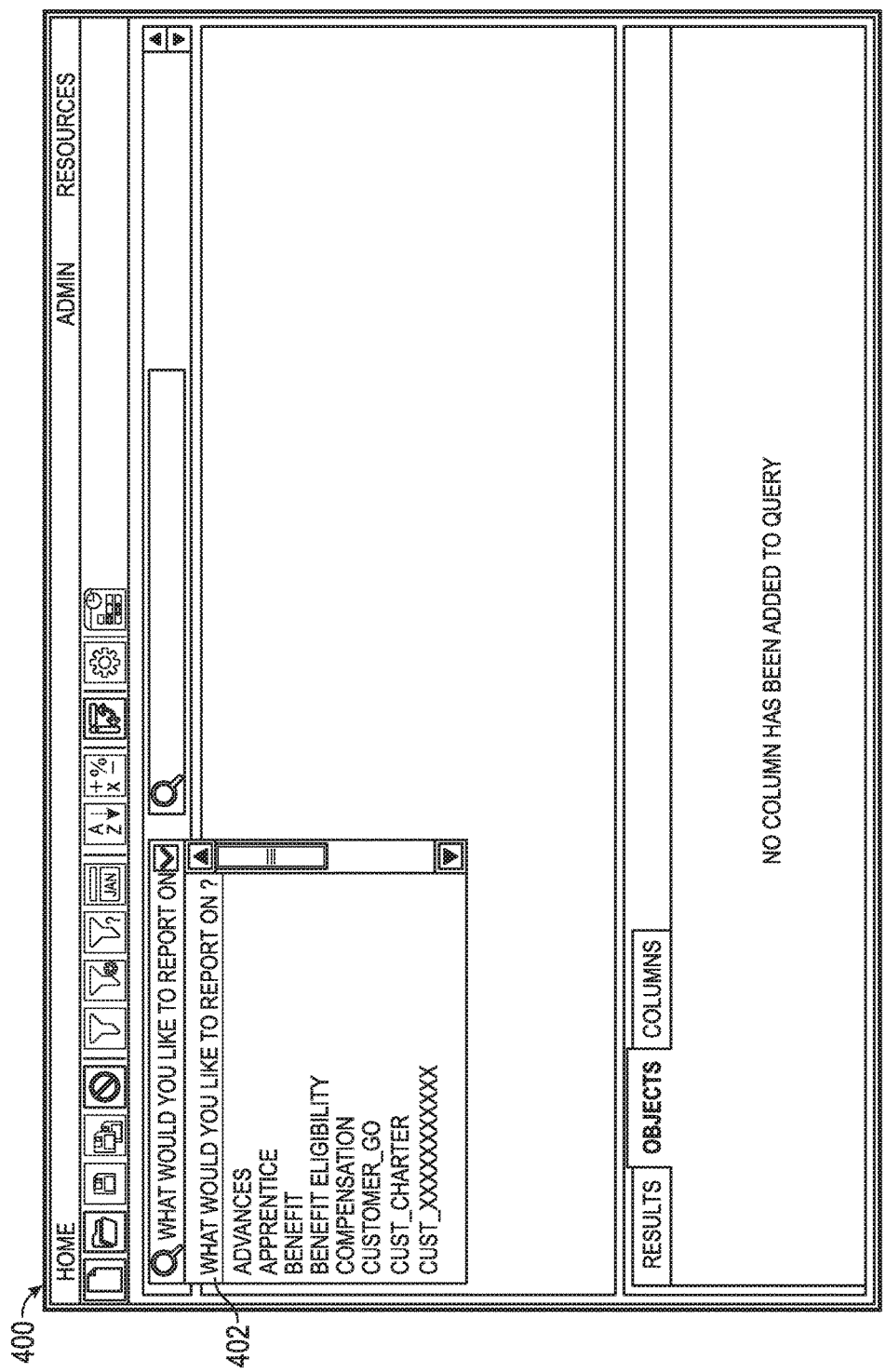
FIG. 4 is a screen capture illustrating a first user interface screen of the reporting tool user interface in accordance with an example embodiment.

FIG. 4 is a screen capture illustrating a first user interface screen 400 of the reporting tool user interface 308 in accordance with an example embodiment. Here, the application 302 retrieves a list of reporting realms from a realm view in a customer schema and displays them in window 402 for selection by the user. A reporting realm is a category of reports, typically organized by the type of data sought in the report. Examples of such data for HR applications include advances, benefits, compensation, etc.

Figure 5:
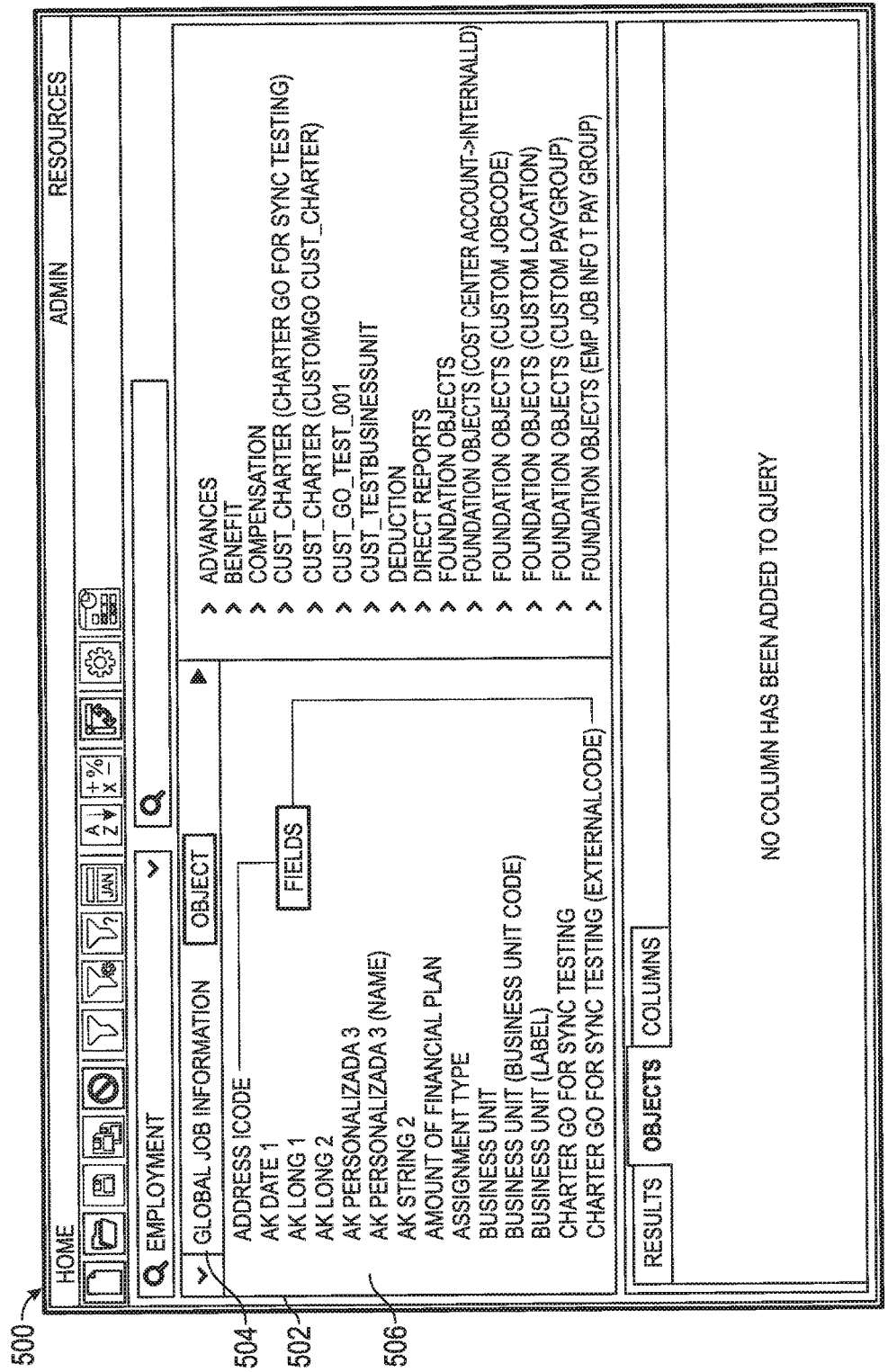
FIG. 5 is a screen capture illustrating a second user interface screen of the reporting tool user interface in accordance with an example embodiment.

FIG. 5 is a screen capture illustrating a second user interface screen 500 of the reporting tool user interface 308 in accordance with an example embodiment. Once the user selects the reporting realm from the window 402 of FIG. 4, the application 302 retrieves a list of objects for the realm, fields for the objects, and relationship views from the customer schema. This is then displayed in window 502. Here, the specified realm is "Employment." Object 504 is depicted, which is "global job information" and has a series of fields 506 related to that object 504. These are all user-selectable, allowing the user to select objects and fields to add to a report. The user may select one or more fields and objects, such as by clicking and dragging them to a specified area, or otherwise causing selection of one or more of them.

Figure 6:
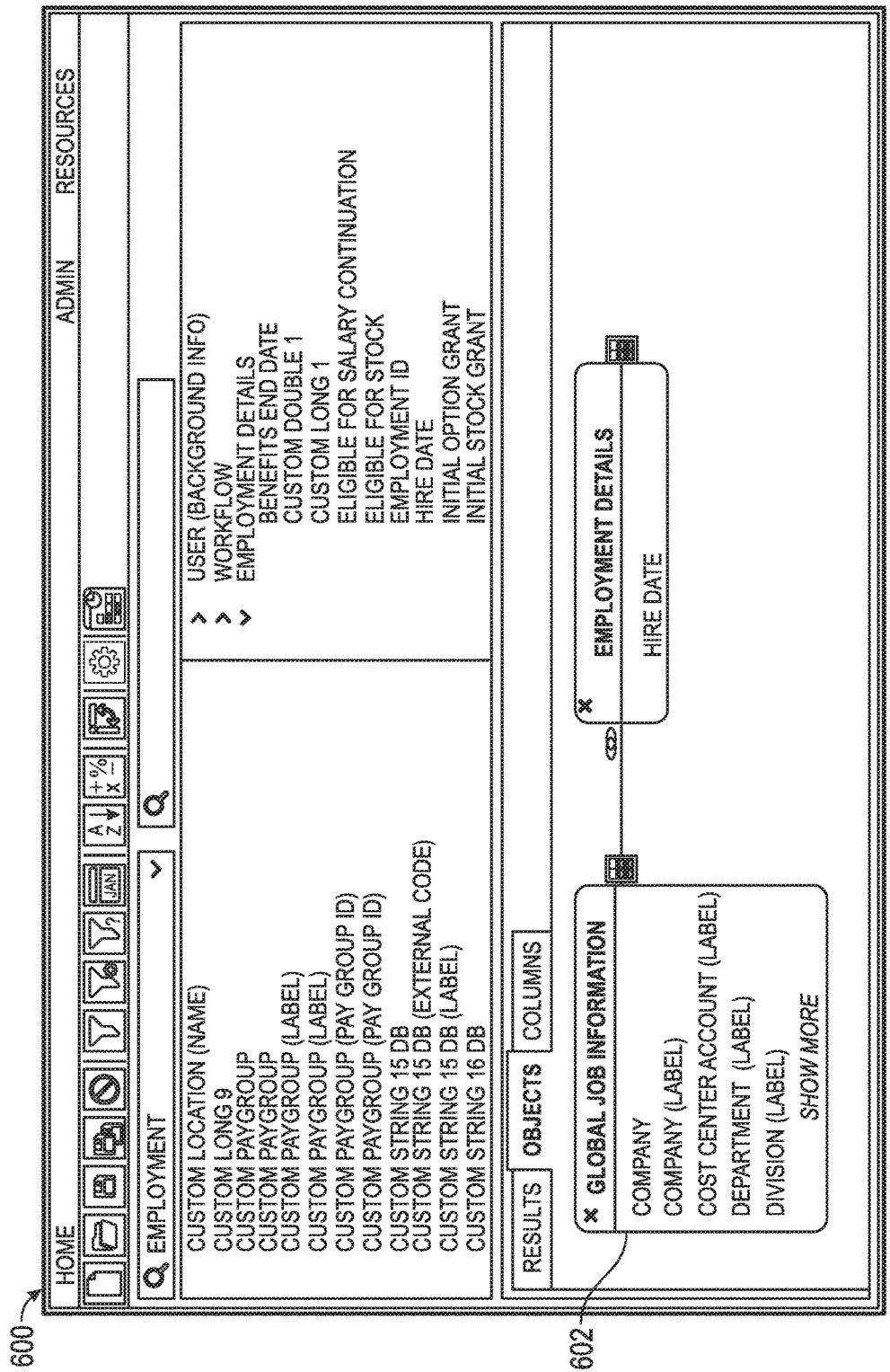
FIG. 6 is a screen capture illustrating a third user interface screen of the reporting tool user interface in accordance with an example embodiment.

FIG. 6 is a screen capture illustrating a third user interface screen 600 of the reporting tool user interface 308 in accordance with an example embodiment. Once the user selects the fields 506 for the report query from window 502 of FIG. 5, the application 302 includes the selected fields 506 in a report template. When this template is selected to be run, a report query is generated, as depicted in window 602. At this point the report may be saved and run.

FIG. 7 is a screen capture illustrating a fourth user interface screen 700 of the reporting tool user interface 308 in accordance with an example embodiment. Here, the results from the report query are displayed in window 702. Both the type of information retrieved (as defined by the generated database queries) and the way the information is presented (such as the formatting and layout) may be defined in the custom report template. In this manner, the user can create numerous custom report templates that can be run to generate corresponding custom reports on various types of data, either by that same user or by other users who may wish to utilize the custom report template(s).

As described earlier in this document, in an example embodiment, a portion of the metadata from the underlying database 303 is persisted while a portion is not. In an example embodiment, standard metadata is persisted. Standard metadata is data that is fairly static (e.g., rarely changes, such as only changing during brand new releases, but not between releases). This may include, for example, a database schema or a portion of a schema. It typically would include a set of standard objects and relationships in the particular solution. In some example embodiments, standard metadata only changes during major version change. A major version change is one that alters a significant amount of functioning of the underlying application and is commonly recognized by a change in a version number in front of a decimal point. For example, if an application is on version 6.3 and a new version 7.0 is released, this would be considered a major version change. If, however, the new version was version 6.4, this would be considered a minor version change.

Figure 8:
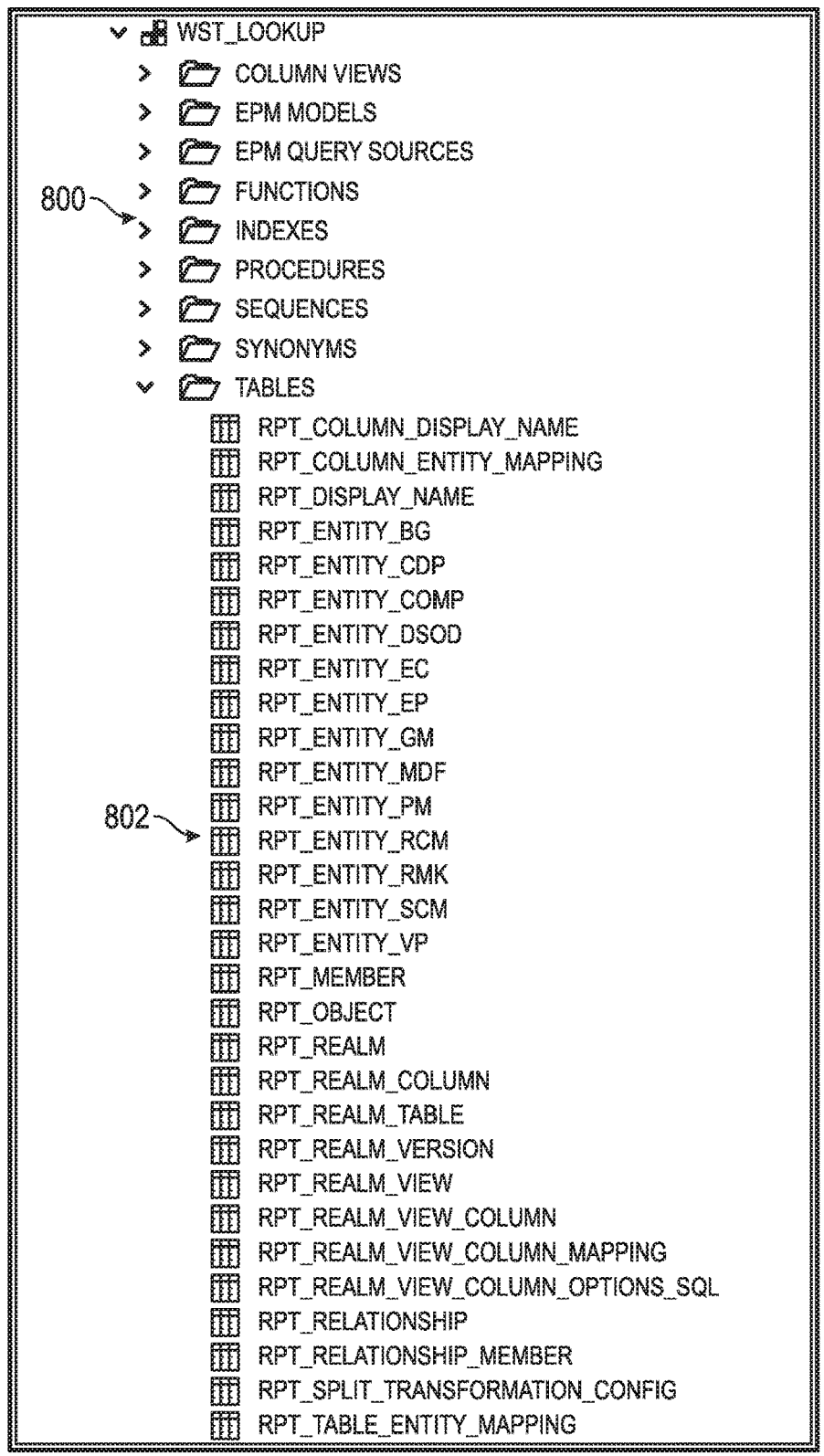
FIG. 8 is a diagram illustrating an example of a schema that is part of standard metadata, in accordance with an example embodiment.

In an example embodiment, standard metadata is persisted in a number of tables in a database stored in a single schema. This schema may be, for example, accessible by all company instances that require reporting metadata. FIG. 8 is a diagram illustrating an example of a schema 800 that is part of standard metadata, in accordance with an example embodiment. Here, the schema 800 may include a series of tables 802 representing the standard metadata.

In an example embodiment, instance-specific data model configurations are also persisted. The data here is instance-specific, in that each record refers to a specific organization instance. This would include information such as a particular customer wishing to expose certain fields for inclusion in reports, but to hide other fields. This would also include country-specific information, such as some fields being available for reports from certain countries but not others. While this information has the capability of changing more frequently than standard metadata, it is beneficial to persist this information because it typically must be extracted from data model extensible markup language (XML) files. By being persisted in the database, the information does not require the parsing of EVIL each time the reporting metadata is generated for use by the user, thus saving processing power and speed. Instance-specific data model configuration may be persisted in a number of tables stored in a database stored in a single scheme. In some example embodiments this may be the same schema as the standard metadata.

Figure 9:
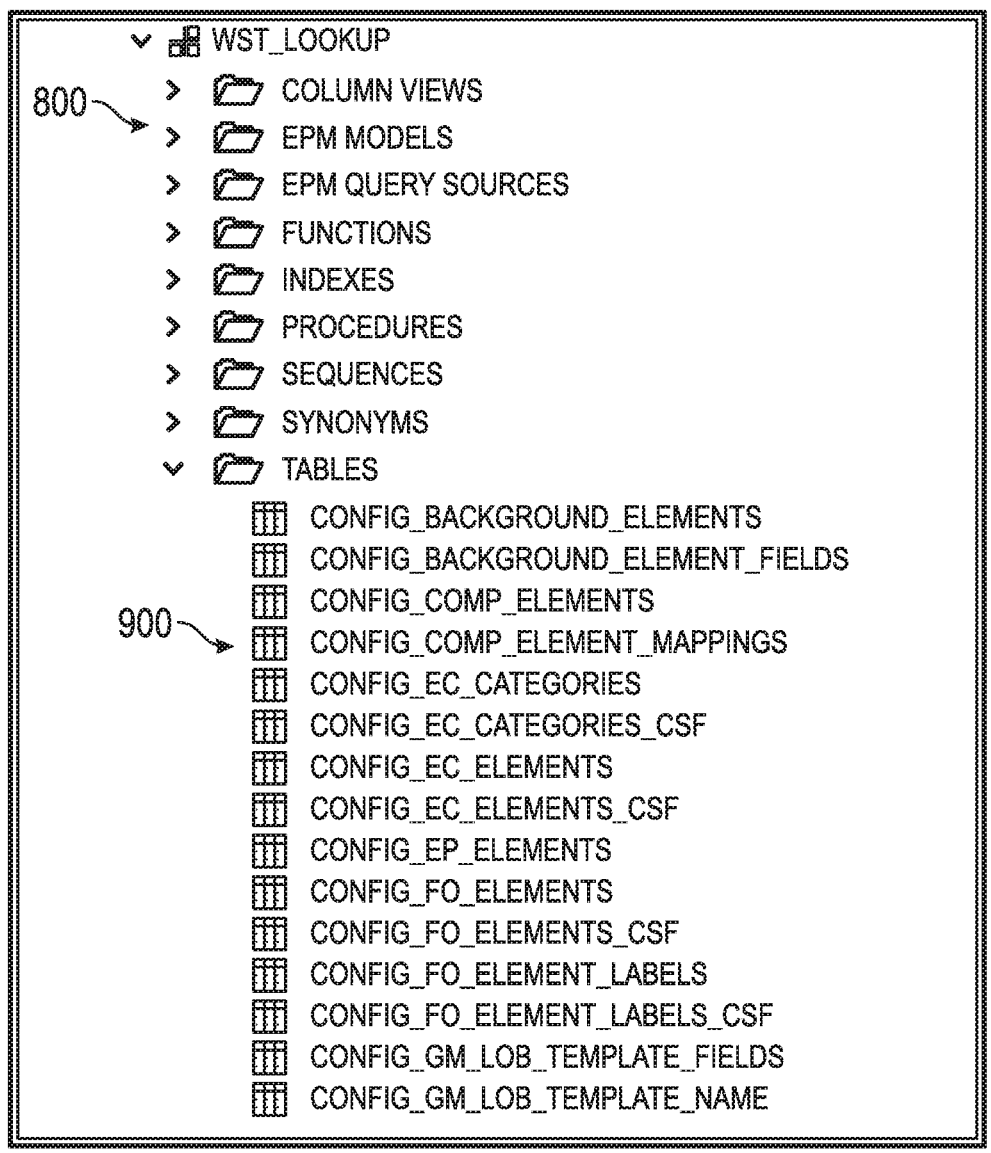
FIG. 9 is a diagram illustrating a schema that includes instance-specific data model configurations in accordance with an example embodiment.

FIG. 9 is a diagram illustrating the schema 800 including instance-specific data model configurations in accordance with an example embodiment. In this example embodiment, the schema 800 is the same schema as was used for the standard metadata in FIG. 8, but that is not necessary for all embodiments. Here the instance-specific data model configurations may also be stored as tables 900 in the schema 800.

It should also be noted that in some example embodiments, the instance-specific data model configurations are not persisted. This is useful in cases where the XML parsing issue does not exist, such as where XML parsing is not required each time the reporting metadata is generated for use by the user.

In an example embodiment, instance-specific reporting metadata is not persisted, but is instead generated in real-time by executing SQL queries stored in database views. These views may be created in the schema for each instance, by the application 302, and they contain the logic needed to generate metadata in real-time using SQL commands to query the standard metadata, instance-specific data model configuration, and instance data. Once generated, the views do not need to be refreshed. Examples of instance-specific reporting metadata include the fact that data only exists for three countries even though the instance-specific data model configuration(s) indicate that 20 countries are available for reporting, and that data only exists for three different address types when the instance-specific data model configuration(s) indicate that five different address types are available for reporting.

Figure 10:
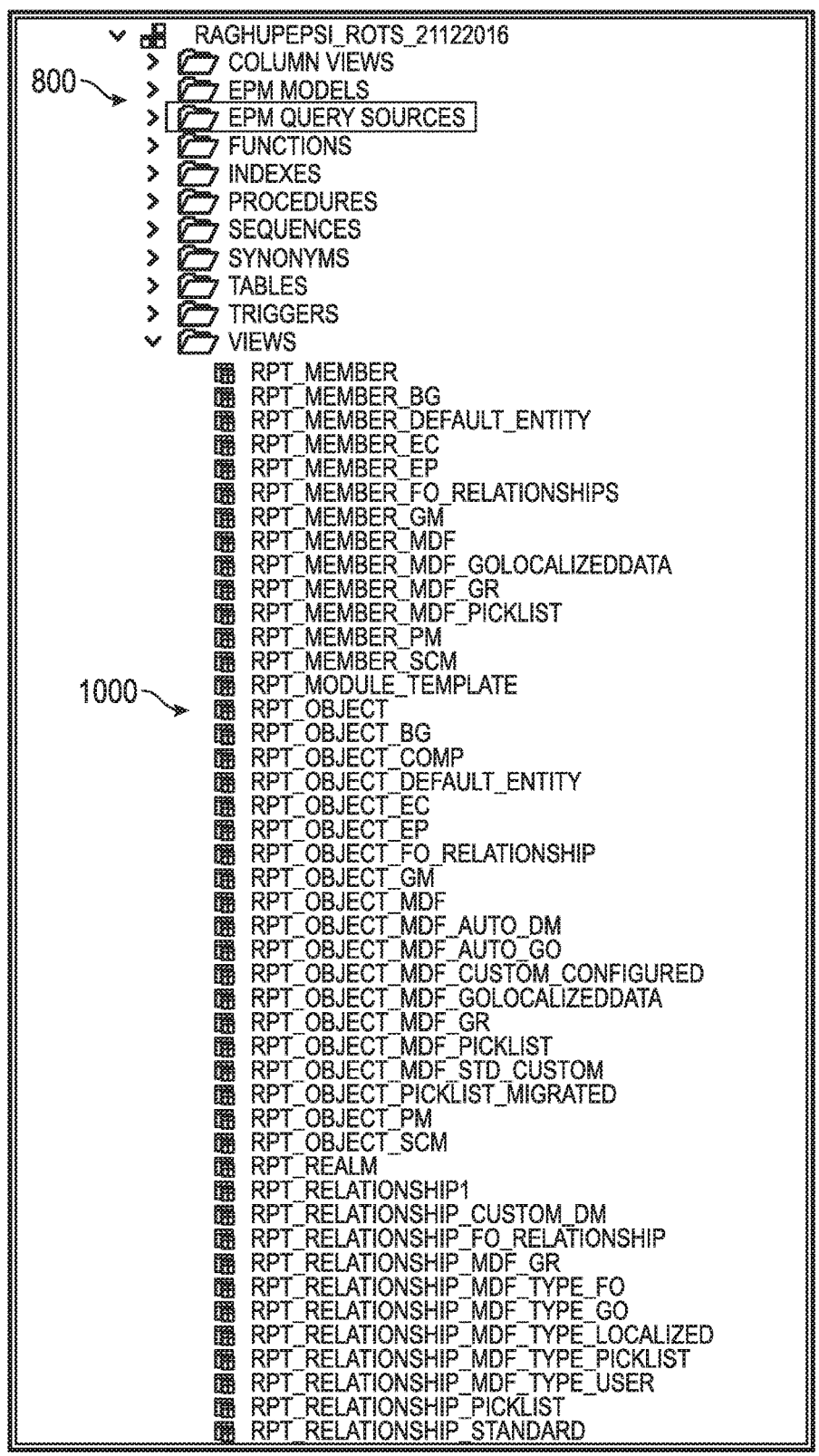
FIG. 10 is a diagram illustrating an example of instance-specific reporting metadata views that have been generated in real-time, in accordance with an example embodiment.

FIG. 10 is a diagram illustrating an example of instance-specific reporting metadata views 1000 that have been generated in real-time, in accordance with an example embodiment. The views 1000 are created in the schema 800 for the instance.

FIG. 11 is a diagram illustrating an example of a particular instance-specific view 1100, in accordance with an example embodiment.

Figure 12:
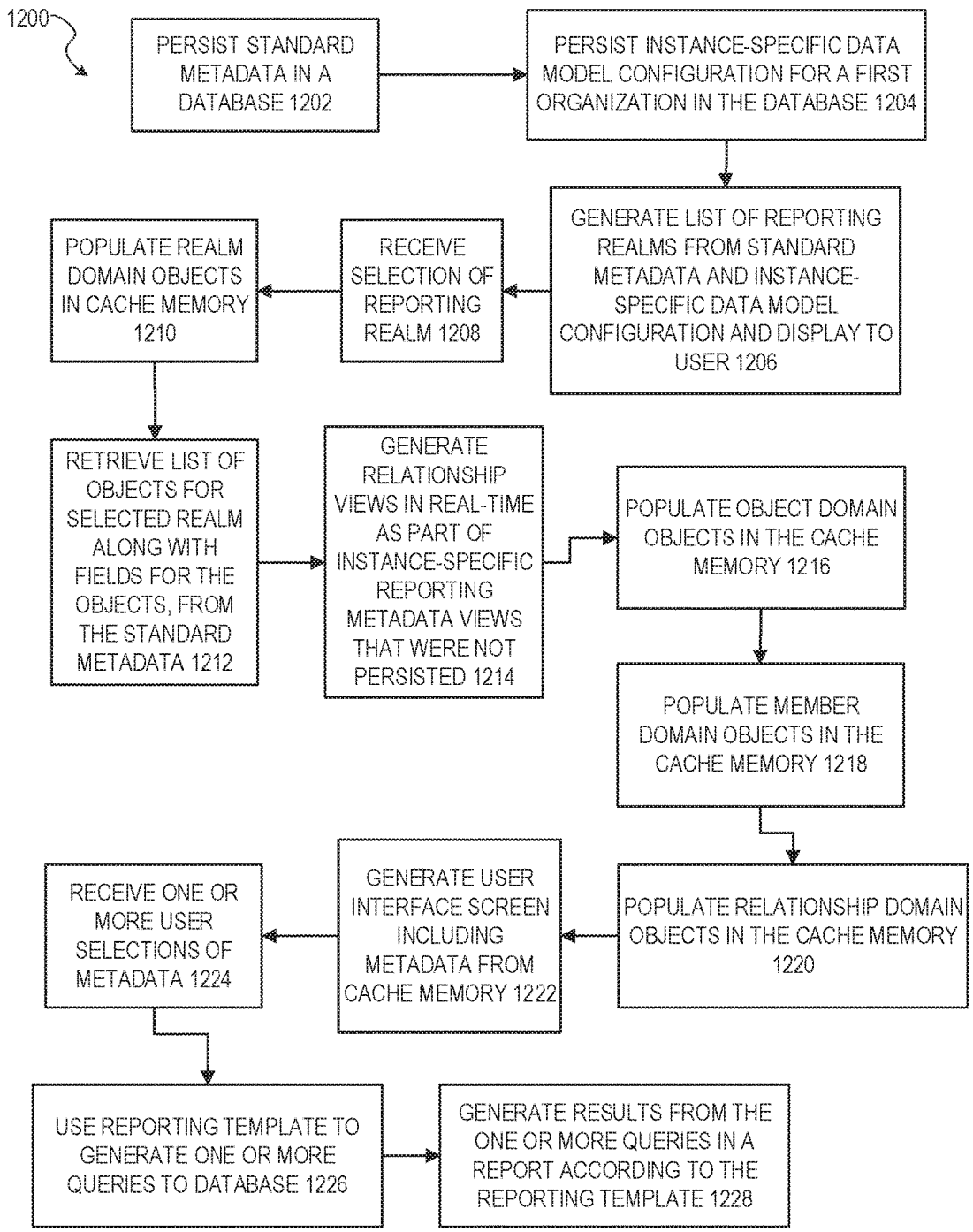
FIG. 12 is a flow diagram illustrating a method of generating user-defined reports on data stored in a database, in accordance with an example embodiment.

FIG. 12 is a flow diagram illustrating a method 1200 of generating user-defined reports on data stored in a database, in accordance with an example embodiment. At operation 1202, standard metadata is persisted in a database. This standard metadata may be persisted in the form of tables reflecting a schema of objects, fields, and relationships between objects and fields. The fields may be selectable by users via a reporting tool user interface. At operation 1204, an instance-specific data model configuration for a first organization is persisted in the database. This instance-specific data model configuration may also be persisted in the form of tables reflecting a schema. Notably, instance-specific reporting metadata views are not persisted.

The remaining operations are performed at report creation time. Specifically, at operation 1206 a list of reporting realms is generated from the standard metadata and from the instance-specific data model configuration and displayed to a user in a user interface. At operation 1208, a selection of a reporting realm is received from the user via the user interface. At operation 1210, realm domain objects are populated into a cache memory.

At operation 1212, a list of objects for the selected realm are retrieved, along with fields for the objects, from the standard metadata. At operation 1214, relationship views are generated in real-time as part of instance-specific reporting metadata views that were not persisted. Each generated object view returns a list of standard objects using information from a corresponding table in the standard metadata as well as information from the instance-specific data model configuration. At operation 1216, object domain objects are populated in the cache memory.

Each generated member view returns a list of standard members using information from a corresponding table in the standard metadata as well as information from the instance-specific model configuration. At operation 1218, member domain objects are populated in the cache memory.

Each generated relationship view returns a list of relationships between members using information from the standard metadata as well as information from the instance-specific model configuration. At operation 1220, relationship domain objects are populated in the cache memory. At this point, all the information needed to display metadata information to the user via the reporting tool user interface is available in the cache memory. Therefore, at operation 1222, a user interface screen is generated including metadata from the cache memory. At operation 1224, one or more user selections of metadata are received via the user interface, indicating how to construct a reporting template. This may involve, for example, the user selecting one or more fields of metadata to include in the reporting template. At operation 1226, the reporting template is used to generate one or more queries to the database. At operation 1228, results from the one or more queries are generated in a report according to the reporting template.

EXAMPLES

Example 1

A system comprising:
a memory;
an application executable by at least one hardware processor of the system to perform operations comprising:

accessing a database to obtain a first metadata type, the database further including a second metadata type and a third metadata type, the first metadata type updated less frequently than the second metadata type, the second metadata type updated less frequently than the third metadata type, the third metadata type including instance-specific reporting metadata; persisting the first metadata type in a memory;

not persisting the instance-specific reporting metadata;

receiving a request from a graphical user interface to provide options for inclusion in a custom report template;

in response to the receiving:

generating information regarding the instance-specific reporting metadata by executing structured query language (SQL) queries stored in database views for the database, the information regarding the instance-specific reporting metadata restricting inclusion of one or more selectable objects and fields in the custom report template.

Example 2

The system of example 1, wherein the application is further to perform operations comprising not persisting the at least one instance-specific data model configuration.

Example 3

The system of examples 1 or 2, wherein the application is further to perform operations comprising persisting the at least one instance-specific data model configuration in the memory and to, upon receiving a request from the graphical user interface to provide options for inclusion in a custom report template, sending information regarding the at least one instance-specific data model configuration to the graphical user interface.

Example 4

The system of any of Examples 1-3, wherein the application obtains the at least one instance-specific data model configuration by parsing one or more Extensible Markup Language (XML) files.

Example 5

The system of any of examples 1-4, wherein the application is further to perform operations comprising not persisting the at least one instance-specific data model configuration and to, upon receiving a request from the graphical user interface to provide options for inclusion in the custom report template, obtaining the at least instance-specific data model configuration by parsing one or more XML files and send information regarding the at least one instance-specific data model configuration to the graphical user interface.

Example 6

The system of any of examples 1-5, wherein the first metadata type includes a database schema.

Example 7

The system of any of examples 1-6, wherein the first metadata type is only updated when a major version change occurs in the database schema.

Example 8

A computerized method comprising:

accessing a database to obtain a first metadata type, the database further including a second metadata type and a third metadata type, the first metadata type updated less frequently than the second metadata type, the second metadata type updated less frequently than the third metadata type, the third metadata type including instance-specific reporting metadata;

persisting the first metadata type in a memory;

not persisting the instance-specific reporting metadata;

receiving a request from a graphical user interface to provide options for inclusion in a custom report template;

in response to the receiving:

generating information regarding the instance-specific reporting metadata by executing structured query language (SQL) queries stored in database views for the database, the information regarding the instance-specific reporting metadata restricting inclusion of one or more selectable objects and fields in the custom report template.

Example 9

The method of example 8, further comprising not persisting the at least one instance-specific data model configuration.

Example 10

The method of examples 8 or 9, further comprising:

persisting at least one instance-specific data model configuration from the database in the memory; and upon receiving a request from the graphical user interface to provide options for inclusion in a custom report template, sending information regarding the at least one instance-specific data model configuration to the graphical user interface.

Example 11

The method of any of examples 8-10, wherein the at least one instance-specific data model configuration is obtained by parsing one or more Extensible Markup Language (XML) files.

Example 12

The method of any of examples 8-11, further comprising not persisting at least one instance-specific data model configuration from the database and to, upon receiving a request from the graphical user interface to provide options for inclusion in the custom report template, obtain the at least instance-specific data model configuration by parsing one or more XML files and send information regarding the at least one instance-specific data model configuration to the graphical user interface.

Example 13

The method of any of examples 8-12, wherein the first metadata type includes a database schema.

Example 14

The method of any of examples 8-12, wherein the first metadata type includes relationships between objects and fields in the database.

Example 15

A non-transitory machine-readable storage medium comprising instructions, which when implemented by one or more machines, cause the one or more machines to perform operations comprising:

accessing a database to obtain a first metadata type, the database further including a second metadata type and a third metadata type, the first metadata type updated less frequently than the second metadata type, the second metadata type updated less frequently than the third metadata type, the third metadata type including instance-specific reporting metadata;

persisting the first metadata type in a memory;
not persisting the instance-specific reporting metadata;
receiving a request from a graphical user interface to provide options for inclusion in a custom report template;
in response to the receiving:
generating information regarding the instance-specific reporting metadata by executing structured query language (SQL) queries stored in database views for the database, the information regarding the instance-specific reporting metadata restricting inclusion of one or more selectable objects and fields in the custom report template.

Example 16

The non-transitory machine-readable storage medium of example 15, wherein the operations further comprise not persisting the at least one instance-specific data model configuration.

Example 17

The non-transitory machine-readable storage medium of examples 15 or 16, further comprising:

persisting at least one instance-specific data model configuration from the database in the memory; and upon receiving a request from the graphical user interface to provide options for inclusion in a custom report template for the user, sending information regarding the at least one instance-specific data model configuration to the graphical user interface.

Example 18

The non-transitory machine-readable storage medium of example 17, wherein the at least one instance-specific data model configuration is obtained by parsing one or more Extensible Markup Language (XML) files.

Example 19

The non-transitory machine-readable storage medium of any of examples 15-19, further comprising not persisting at least one instance-specific data model configuration from the database and to, upon receiving a request from the graphical user interface to provide options for inclusion in the custom report template, obtain the at least instance-specific data model configuration by parsing one or more XML files and send information regarding the at least one instance-specific data model configuration to the graphical user interface.

Example 20

The non-transitory machine-readable storage medium of any of examples 15-19, wherein the first metadata type includes a database schema.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented, in some embodiments, in the context of a machine and an associated software architecture. The sections below describe representative software architecture(s) and machine hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
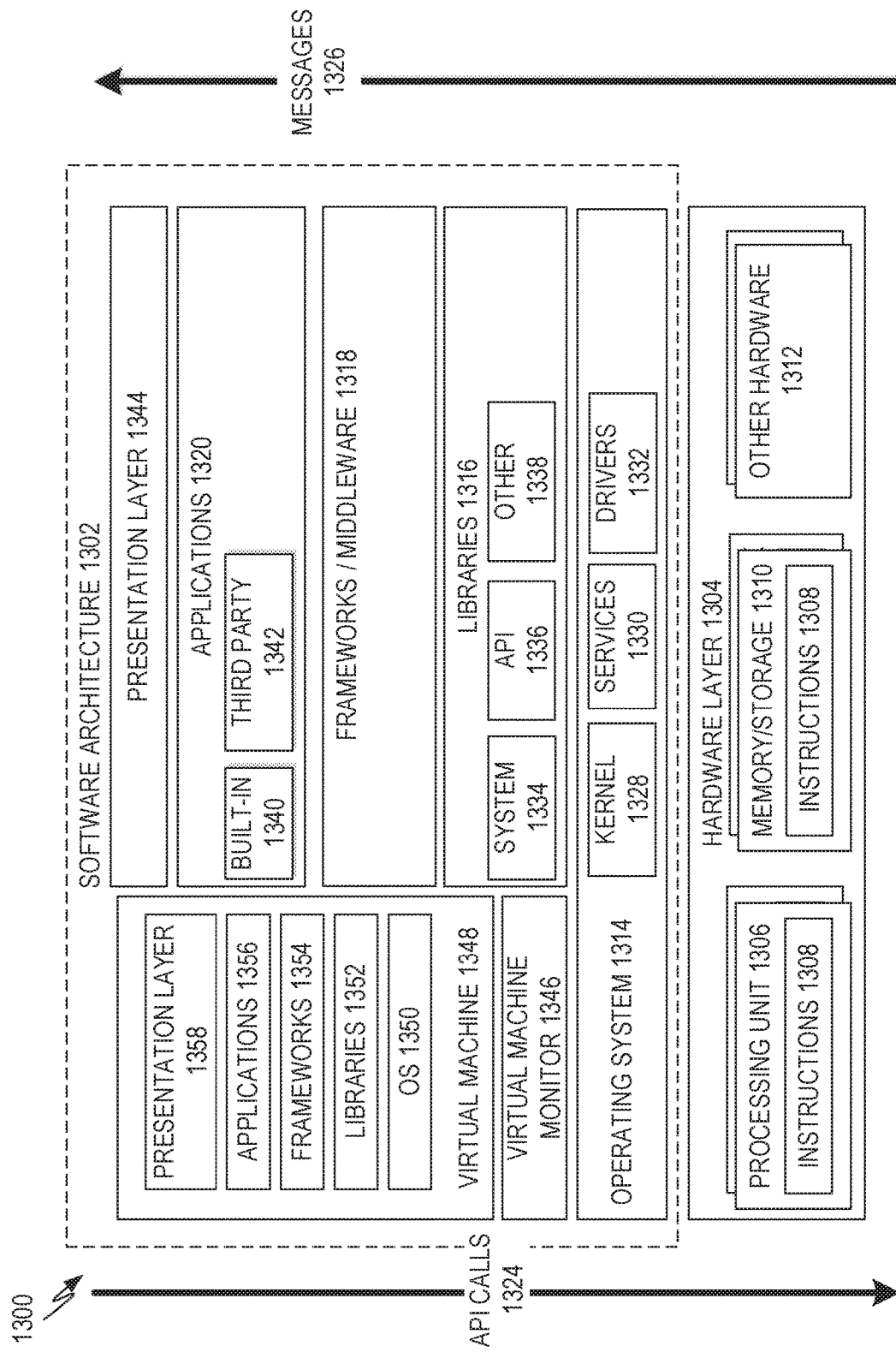
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture 1302, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature, and not all software architectures have all layers. For example, some mobile or special purpose operating systems may not provide a frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), drivers, audio drivers, power management drivers, and so forth, depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330, and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 may provide a higher-level common infrastructure that may be utilized by the applications 1320 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. Third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1342 may invoke the API calls 1324 provided by the mobile operating system such as the operating system 1314 to facilitate functionality described herein.

The applications 1320 may utilize built-in operating system functions (e.g., kernel 1328, services 1330, and/or drivers 1332), libraries (e.g., system libraries 1334, API libraries 1336, and other libraries 1338), and frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. A virtual machine creates a software environment where applications/modules can execute as if they were executing on a hardware machine (such as the machine 1400 of FIG. 14, for example). The virtual machine 1348 is hosted by a host operating system (operating system 1314 in FIG. 13) and typically, although not always, has a virtual machine monitor 1346, which manages the operation of the virtual machine 1348 as well as the interface with the host operating system (i.e., operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Example Machine Architecture and Machine-Readable Medium

Figure 14:
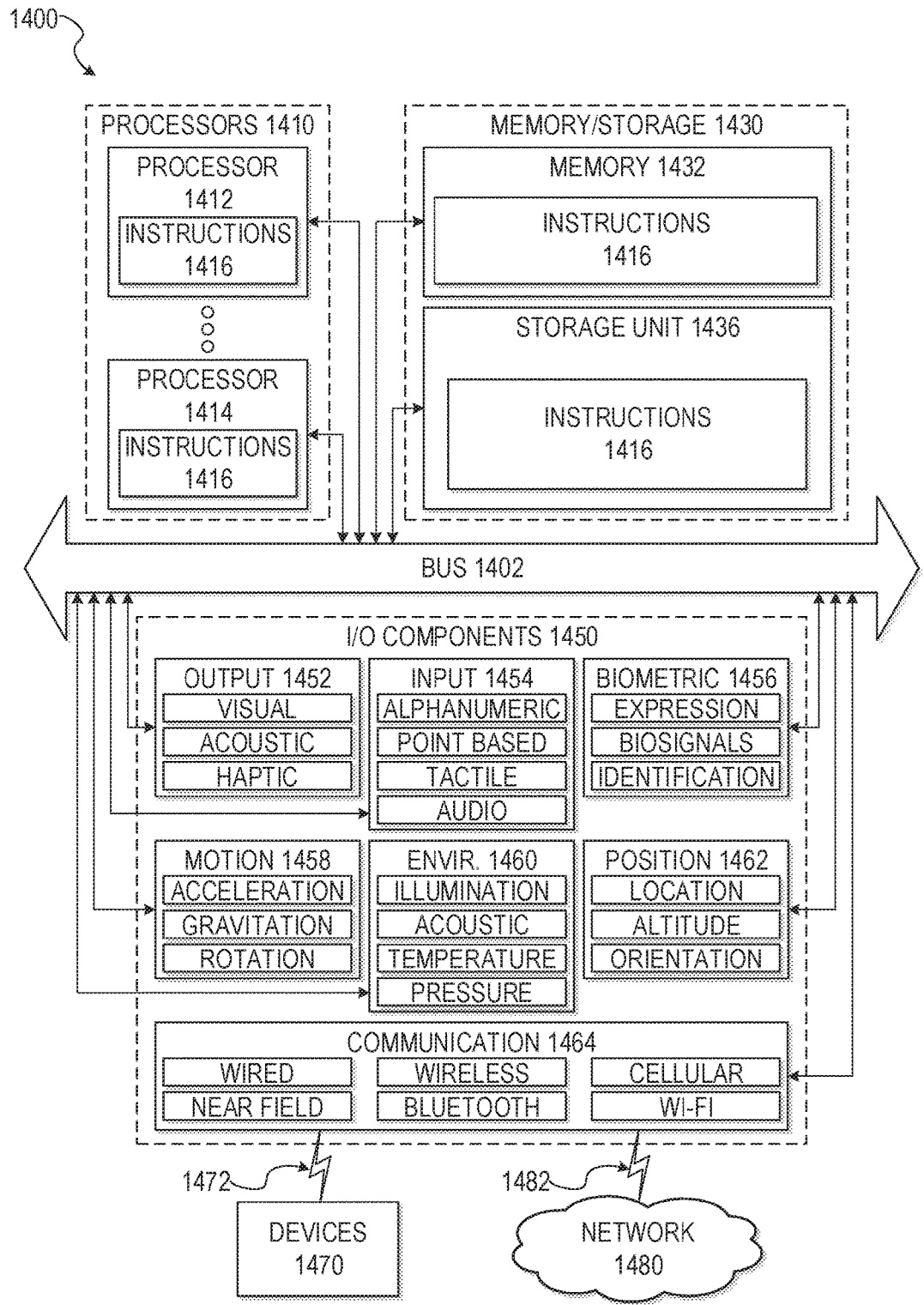
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions 1416 from a machine-readable medium (e.g., a machine-readable storage medium) and perform any one or more of the methodologies discussed herein. Specifically, FIG. 14 shows a diagrammatic representation of the machine 1400 in the example form of a computer system, within which the instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute the flow diagram of FIG. 12. Additionally, or alternatively, the instructions 1416 may implement modules of FIG. 1, and so forth. The instructions 1416 transform the general, non-programmed machine 1400 into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" may also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1412 and a processor 1414 that may execute the instructions 1416. The term "processor" is intended to include a multi-core processor 1412, 1414 that may comprise two or more independent processors 1412, 1414 (sometimes referred to as "cores") that may execute the instructions 1416 contemporaneously. Although FIG. 14 shows multiple processors 1410, the machine 1400 may include a single processor 1412, 1414 with a single core, a single processor 1412, 1414 with multiple cores (e.g., a multi-core processor 1412, 1414), multiple processors 1412, 1414 with a single core, multiple processors 1412, 1414 with multiples cores, or any combination thereof.

The memory/storage 1430 may include a memory 1432, such as a main memory, or other memory storage, and a storage unit 1436, both accessible to the processors 1414 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1414 (e.g., within the processor 1412, 1414's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store the instructions 1416 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine 1400 will depend on the type of machine 1400. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PUP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472 respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a memory;
    an application executable by at least one hardware processor of the system to perform operations comprising:
        accessing a database to obtain reporting metadata, the reporting metadata including metadata of a first metadata type, metadata of a second metadata type, and metadata of a third metadata type, the first metadata type being of a type that is updated by the application less frequently than the second metadata type is updated by the application, the second metadata type being of a type that is updated less frequently by the application than the third metadata type is updated by the application, the third metadata type including instance-specific reporting metadata;
        based on a determination that a first portion of the reporting data is of the first metadata type, persisting the first portion in a memory;

based on a determination that a third portion of the reporting data is of the third metadata type, not persisting the third portion of the reporting data;
receiving a request from a graphical user interface to provide options for inclusion in a custom report template; and
in response to the receiving:
generating information regarding the instance-specific reporting metadata by executing structured query language (SQL) queries stored in database views for the database, the information regarding the instance-specific reporting metadata preventing inclusion of one or more selectable objects and fields in the custom report template.

2. The system of claim 1, wherein the application is further to perform operations comprising not persisting an instance-specific data model configuration.

3. The system of claim 1, wherein the application is further to perform operations comprising persisting an instance-specific data model configuration in the memory and to, upon receiving a request from the graphical user interface to provide options for inclusion in a custom report template, sending information regarding the instance-specific data model configuration to the graphical user interface.

4. The system of claim 3, wherein the application obtains the instance-specific data model configuration by parsing one or more Extensible Markup Language (XML) files.

5. The system of claim 1, wherein the application is further to perform operations comprising not persisting an instance-specific data model configuration and to, upon receiving a request from the graphical user interface to provide options for inclusion in the custom report template, obtaining the instance-specific data model configuration by parsing one or more XML files and send information regarding the instance-specific data model configuration to the graphical user interface.

6. The system of claim 1, wherein the first metadata type includes a database schema.

7. The system of claim 1, wherein the first metadata type is only updated when a major version change occurs in the database schema.

8. A computerized method comprising:
accessing a database to obtain reporting metadata, the reporting metadata including metadata of a first metadata type, metadata of a second metadata type, and metadata of a third metadata type, the first metadata type being of a type that is updated by the application less frequently than the second metadata type is updated by the application, the second metadata type being of a type that is updated less frequently by the application than the third metadata type is updated by the application, the third metadata type including instance-specific reporting metadata;
based on a determination that a first portion of the reporting data is of the first metadata type, persisting the first portion in a memory;
based on a determination that a third portion of the reporting data is of the third metadata type, not persisting the third portion of the reporting data;
receiving a request from a graphical user interface to provide options for inclusion in a custom report template; and
in response to the receiving:
generating information regarding the instance-specific reporting metadata by executing structured query language (SQL) queries stored in database views for the database, the information regarding the instance-specific reporting metadata preventing inclusion of one or more selectable objects and fields in the custom report template.

9. The method of claim 8, further comprising not persisting an instance-specific data model configuration.

10. The method of claim 8, further comprising:
persisting an instance-specific data model configuration from the database in the memory; and
upon receiving a request from the graphical user interface to provide options for inclusion in a custom report template, sending information regarding the instance-specific data model configuration to the graphical user interface.

11. The method of claim 10, wherein the instance-specific data model configuration is obtained by parsing one or more Extensible Markup Language (XML) files.

12. The method of claim 8, further comprising not persisting an instance-specific data model configuration from the database and to, upon receiving a request from the graphical user interface to provide options for inclusion in the custom report template, obtain the instance-specific data model configuration by parsing one or more XML files and send information regarding the instance-specific data model configuration to the graphical user interface.

13. The method of claim 8, wherein the first metadata type includes a database schema.

14. The method of claim 8, wherein the first metadata type includes relationships between objects and fields in the database.

15. A non-transitory machine-readable storage medium comprising instructions, which when implemented by one or more machines, cause the one or more machines to perform operations comprising:
accessing a database to obtain reporting metadata, the reporting metadata including metadata of a first metadata type, metadata of a second metadata type, and metadata of a third metadata type, the first metadata type being of a type that is updated by the application less frequently than the second metadata type is updated by the application, the second metadata type being of a type that is updated less frequently by the application than the third metadata type is updated by the application, the third metadata type including instance-specific reporting metadata;
based on a determination that a first portion of the reporting data is of the first metadata type, persisting the first portion in a memory;
based on a determination that a third portion of the reporting data is of the third metadata type, not persisting the third portion of the reporting data;
receiving a request from a graphical user interface to provide options for inclusion in a custom report template; and
in response to the receiving:
generating information regarding the instance-specific reporting metadata by executing structured query language (SQL) queries stored in database views for the database, the information regarding the instance-specific reporting metadata preventing inclusion of one or more selectable objects and fields in the custom report template.

16. The non-transitory machine-readable storage medium of claim 15, wherein the operations further comprise not persisting an instance-specific data model configuration.

17. The non-transitory machine-readable storage medium of claim 15, further comprising:

persisting an instance-specific data model configuration from the database in the memory; and upon receiving a request from the graphical user interface to provide options for inclusion in a custom report template for the user, sending information regarding the instance-specific data model configuration to the graphical user interface.

18. The non-transitory machine-readable storage medium of claim 17, wherein the instance-specific data model configuration is obtained by parsing one or more Extensible Markup Language (XML) files.

19. The non-transitory machine-readable storage medium of claim 15, further comprising not persisting an instance-specific data model configuration from the database and to, upon receiving a request from the graphical user interface to provide options for inclusion in the custom report template, obtain the instance-specific data model configuration by parsing one or more XML files and send information regarding the instance-specific data model configuration to the graphical user interface.

20. The non-transitory machine-readable storage medium of claim 15, wherein the standard metadata includes a database schema.

* * * * *